US009005472B2

(12) United States Patent
Raman et al.

(10) Patent No.: US 9,005,472 B2
(45) Date of Patent: Apr. 14, 2015

(54) AQUEOUS POLISHING AGENT AND GRAFT COPOLYMERS AND THEIR USE IN A PROCESS FOR POLISHING PATTERNED AND UNSTRUCTURED METAL SURFACES

(75) Inventors: Vijay Immanuel Raman, Mannheim (DE); Ilshat Gubaydullin, Ludwigshafen (DE); Mario Brands, Ludwigshafen (DE); Yuzhuo Li, Heidelberg (DE); Maxim Peretolchin, Mannheim (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/580,039

(22) PCT Filed: Jan. 19, 2011

(86) PCT No.: PCT/IB2011/050237
§ 371 (c)(1),
(2), (4) Date: Aug. 20, 2012

(87) PCT Pub. No.: WO2011/104640
PCT Pub. Date: Sep. 1, 2011

(65) Prior Publication Data
US 2012/0322264 A1 Dec. 20, 2012

Related U.S. Application Data

(60) Provisional application No. 61/307,466, filed on Feb. 24, 2010.

(51) Int. Cl.
| | |
|---|---|
| H01L 21/302 | (2006.01) |
| H01L 21/461 | (2006.01) |
| C03C 15/00 | (2006.01) |
| C03C 25/68 | (2006.01) |
| C09K 13/00 | (2006.01) |
| C09K 13/04 | (2006.01) |
| C09K 13/08 | (2006.01) |
| C09K 13/06 | (2006.01) |
| C09G 1/02 | (2006.01) |
| C09K 3/14 | (2006.01) |
| C08F 283/00 | (2006.01) |

(52) U.S. Cl.
CPC ............... C09G 1/02 (2013.01); C09K 3/1463 (2013.01); C08F 283/00 (2013.01)

(58) Field of Classification Search
None
See application file for complete search history.

(56) References Cited

U.S. PATENT DOCUMENTS

| | | | |
|---|---|---|---|
| 3,301,808 A | 1/1967 | Mack, Jr. et al. | |
| 4,954,142 A | 9/1990 | Carr et al. | |
| 5,958,288 A | 9/1999 | Mueller et al. | |
| 5,980,775 A | 11/1999 | Grumbine et al. | |
| 6,015,506 A | 1/2000 | Streinz et al. | |
| 6,068,787 A | 5/2000 | Grumbine et al. | |
| 6,083,419 A | 7/2000 | Grumbine et al. | |
| 6,136,711 A | 10/2000 | Grumbine et al. | |
| 7,018,560 B2 | 3/2006 | Liu et al. | |
| 7,037,351 B2 * | 5/2006 | Li et al. ........................... | 51/298 |
| 7,833,431 B2 | 11/2010 | Minamihaba et al. | |
| 2006/0175298 A1 | 8/2006 | Zhao et al. | |
| 2006/0243702 A1 | 11/2006 | Minamihaba et al. | |
| 2008/0035882 A1 | 2/2008 | Zhao et al. | |
| 2008/0248727 A1 * | 10/2008 | Shindo et al. .................... | 451/36 |
| 2010/0093951 A1 * | 4/2010 | Oikawa et al. ................. | 525/474 |
| 2010/0095468 A1 | 4/2010 | Peretolchin et al. | |
| 2011/0028603 A1 | 2/2011 | Peretolchin et al. | |
| 2011/0091733 A1 | 4/2011 | Feuerhake et al. | |
| 2011/0092635 A1 | 4/2011 | Venkatesh et al. | |
| 2011/0130080 A1 | 6/2011 | KÅsmayr et al. | |
| 2011/0189487 A1 | 8/2011 | Zacharias et al. | |
| 2011/0269312 A1 | 11/2011 | Li et al. | |
| 2012/0045970 A1 | 2/2012 | Li et al. | |
| 2012/0058641 A1 | 3/2012 | Raman et al. | |

(Continued)

FOREIGN PATENT DOCUMENTS

| | | |
|---|---|---|
| BE | 663 786 | 9/1965 |
| CN | 1560161 | 1/2005 |

(Continued)

OTHER PUBLICATIONS

U.S. Appl. No. 13/821,759, filed Apr. 25, 2013, Noller, et al.
U.S. Appl. No. 13/821,746, filed Mar. 8, 2013, Li, et al.
U.S. Appl. No. 13/821,769, Mar. 8, 2013, Li, et al.
U.S. Appl. No. 13/821,757, Mar. 8, 2013, Li, et al.
U.S. Appl. No. 13/820,765, filed Apr. 25, 2013, Li, et al.
U.S. Appl. No. 13/878,361, filed May 28, 2013, Raman, et al.
Extended European Search Report issued Jun. 28, 2013, in European Patent Application No. 11746939.5.
International Search Report Issued May 19, 2011 in PCT/IB11/50237 Filed Jan. 19, 2011.

(Continued)

*Primary Examiner* — Nadine Norton
*Assistant Examiner* — Stephanie Duclair
(74) *Attorney, Agent, or Firm* — Oblon, McClelland, Maier & Neustadt, L.L.P.

(57) ABSTRACT

An aqueous polishing agent, comprising, as the abrasive, at least one kind of polymer particles (A) finely dispersed in the aqueous phase and having at their surface a plurality of at least one kind of functional groups (a1) capable of interacting with the metals and/or the metal oxides on top of the surfaces to be polished and forming complexes with the said metals and metal cations, the said polymer particles (A) being preparable by the emulsion or suspension polymerization of at least one monomer containing at least one radically polymerizable double bond in the presence of at least one oligomer or polymer containing a plurality of functional groups (a1); graft copolymers preparable by the emulsion or suspension polymerization of at least one monomer containing at least one radically polymerizable double bond in the presence of at least one oligomeric or polymeric aminotriazine-polyamine condensate; and a process for the chemical and mechanical polishing of patterned and unstructured metal surfaces making use of the said aqueous polishing agent.

13 Claims, No Drawings

(56) References Cited

U.S. PATENT DOCUMENTS

| | | |
|---|---|---|
| 2012/0058643 A1 | 3/2012 | Raman et al. |
| 2012/0077419 A1 | 3/2012 | Zhang et al. |
| 2012/0083188 A1 | 4/2012 | Kroell et al. |
| 2012/0138224 A1 | 6/2012 | Peretolchin et al. |
| 2012/0141772 A1 | 6/2012 | Braun et al. |
| 2012/0208344 A1 | 8/2012 | Lauter et al. |
| 2012/0219815 A1 | 8/2012 | Schmidt et al. |
| 2012/0225965 A1 | 9/2012 | Steinke et al. |
| 2012/0231627 A1 | 9/2012 | Raman et al. |
| 2012/0235081 A1 | 9/2012 | Raman et al. |
| 2012/0252987 A1 | 10/2012 | Peretolchin et al. |

FOREIGN PATENT DOCUMENTS

| | | |
|---|---|---|
| CN | 1680508 | 10/2005 |
| CN | 101208398 | 6/2008 |
| CN | 101589198 | 11/2009 |
| DE | 101 26 652 | 12/2002 |
| EP | 0 919 602 | 6/1999 |
| EP | 1 036 836 | 9/2000 |
| EP | 1 077 240 | 2/2001 |
| EP | 1 306 415 | 5/2003 |
| EP | 1 505 133 | 2/2005 |
| JP | 2005 101545 | 4/2005 |
| JP | 2008-034864 | 2/2008 |
| JP | 2008-251730 | 10/2008 |
| JP | 2009-147267 A | 7/2009 |
| WO | 2004 063301 | 7/2004 |
| WO | 2005 014753 | 2/2005 |
| WO | 2006 74248 | 7/2006 |
| WO | 2006 086265 | 8/2006 |
| WO | 2006 134462 | 12/2006 |
| WO | WO 2008/072765 * | 6/2008 |
| WO | 2008 148766 | 12/2008 |
| WO | 2010 018142 | 2/2010 |
| WO | WO 2010/127938 A1 | 11/2010 |
| WO | 2011 058503 | 5/2011 |

OTHER PUBLICATIONS

U.S. Appl. No. 14/004,689, filed Sep. 12, 2013, Noller, et al.
U.S. Appl. No. 14/356,530, filed May 6, 2014, Seyffer, et al.
Office Action issued Jul. 25, 2014, in Chinese Patent Application No. 201180010931.4 filed Jan. 19, 2011 (English translation only).

* cited by examiner

US 9,005,472 B2

AQUEOUS POLISHING AGENT AND GRAFT COPOLYMERS AND THEIR USE IN A PROCESS FOR POLISHING PATTERNED AND UNSTRUCTURED METAL SURFACES

FIELD OF THE INVENTION

The invention is directed to a novel aqueous polishing agent and graft copolymers and their use in a novel process for polishing, in particular for the chemical mechanical polishing (CMP), of patterned and unstructured metal surfaces.

CITED DOCUMENTS

The documents cited in the present application are incorporated by reference in their entirety.

BACKGROUND OF THE INVENTION

Integrated circuits (ICs) consist of structured electrically semiconducting, non-conducting and conducting thin layers. These patterned layers are customarily prepared by applying a layer material, for example, by vapor deposition and patterning it by a microlithographic process. By way of the combination of the various electrically semiconducting, non-conducting and conducting layered materials the electronic circuit elements such as transistors, capacitors, resistors and wirings are fabricated.

The quality of an IC and of its function depends particularly on the precision with which the various layer materials can be applied and patterned.

However, with an increasing number of layers the planarity of the layers decreases significantly. This leads to the failure of one or more functional elements of the IC and, therefore, to the failure of the complete IC after a certain number of layers has been reached.

The decrease of the planarity of the layers is caused by the buildup of new layers on top of layers already patterned. By the patterning altitude differences are created which can add up to 0.6 µm per layer. These altitude differences add up from layer to layer and bring about that the next following layer can no longer be applied onto a planar surface but only onto an uneven surface. The first result is that the layer subsequently applied has an irregular thickness. In extreme cases, imperfections, defects in the electronic functional elements and lacking electrical contacts are caused. Moreover, uneven surfaces lead to problems with the patterning. In order to be able to create sufficiently small patterns, an extremely acute depth of focus is a necessary in the microlithographic process step. However, these patterns can only be imaged with acuity on a planar surface. The more the locations deviate from the planarity, the murkier the image becomes.

In order to solve this problem, a so-called chemical mechanical polishing (CMP) is carried out. The CMP causes a global planarization of the patterned surface by the removal of protruding features of the layer until a planar layer is obtained. Because of this, the subsequent buildup can take place on top of a planar surface exhibiting no altitude differences, and the precision of the patterning and of the functionality of the elements of the IC is maintained.

Typical examples for the global planarization are dielectric CMP, nickel phosphide CMP and silicium or polysilicium CMP.

In addition to the global planarization to overcome lithographical difficulties, there are two other important applications for CMP. One is to fabricate microstructures. Typical examples for this application are copper CMP, tungsten CMP or shallow trench isolation (STI) CMP, in particular the Damascene process described below. The other is defect correction or elimination, as for example sapphire CMP.

A CMP process step is carried out with the help of special polishers, polishing pads and polishing agents which are also referred to in the art as polishing slurries or CMP slurries. A CMP slurry is a composition, which in combination with the polishing pad causes the removal of the material to be polished.

In case that wafers with semiconductor layers are to be polished, the precision requirements for the process step and, thus, the requirements set for the CMP slurry are particularly strict.

A series of parameters are used for evaluating the efficiency of CMP slurries and for characterizing their activity. The material removal rate (MRR), that is the speed with which the material to be polished is removed, the selectivity, that is the ratio of the removal rate of the material to be polished to the removal rates of other materials present, the removal uniformity within a wafer (WIWNU; within wafer non-uniformity) and the removal uniformity from wafer to wafer (WTWNU; wafer to wafer non-uniformity) as well as the number of defects per unit of area rank among these parameters.

The copper Damascene process is increasingly used for the fabrication of IC (cf., for example, the European patent application EP 1 306 415 A2, page 2, paragraph [0012]). In order to produce the copper circuit paths, it is necessary to remove a copper layer chemically mechanically in this process with the help of a CMP slurry, which process is also called "copper CMP process" in the art. The completed copper circuit paths are embedded in a dielectric. Customarily, a barrier layer is located between the copper and the dielectric.

The CMP agents or slurries customarily used in these CMP processes contain dispersed, colloidal inorganic particles such as silica particles as abrasive materials (cf., for example, U.S. Pat. No. 4,954,142, U.S. Pat. No. 5,958,288, U.S. Pat. No. 5,980,775, U.S. Pat. No. 6,015,506, U.S. Pat. No. 6,068,787, U.S. Pat. No. 6,083,419, and U.S. Pat. No. 6,136,711).

However, there are several disadvantages associated with the use of inorganic particles. First of all, they have to be dispersed in the aqueous phase in a separate dispersion step. Secondly, due to their high densities, they have a tendency to settle out of their aqueous dispersions. Consequently, the respective CMP agents or slurries can be unstable. Thirdly, these CMP agents fail to adequately control dishing and erosion, corrosion, defects of the surface, polishing rate and selectivity among different materials on the surface. Quite often, the inorganic particles and their aggregates cause scratches in the polished surfaces. However, for obvious reasons, such scratches have to be avoided. It must be added that the problem of scratching is particularly severe when the metal wirings or interconnects are embedded in the comparatively soft and spongelike ultra-low-k dielectric materials which are easily damaged by the hard inorganic abrasive particles.

These problems have been ameliorated to a certain degree by the use of organic particles as the abrasive materials.

For example, the European patent application EP 0 919 602 A1 discloses a CMP slurry comprising cross-linked polymeric particles prepared by emulsion polymerization of vinyl compounds having no functional groups that can react with the metal of the surface to be polished, as for example, styrene and divinylbenzene. Optionally, vinyl, acrylate or methacrylate monomers having functional groups such as amide groups, hydroxyl groups, methoxy groups or glycidyl groups may be additionally used. The dispersion resulting from the polymerization can be used directly as a CMP slurry. However, due to the absence or the low concentration of metal reactive functional groups, complexing agents have to be used in order to obtain a high removal rate MRR.

The European patent EP 1 077 240 B1 discloses a CMP slurry comprising cross-linked and non-cross-linked polymeric particles preferably prepared by suspension polymerization of ally unsaturated comonomers using polymerization initiators which introduce reactive functional groups such as amino, pyridyl or acrylamide groups that can react with the metal of the surface to be polished. Also here, the dispersion resulting from the polymerization can be used directly as a CMP slurry. Nevertheless, the concentration of metal reactive functional groups at the surface of the particles needs to be increased, in order to increase the removal rate MRR without increasing the static etch rate SER.

The international patent application WO 2008/148766 A1 discloses highly branched melamine-polyamine condensates. However, only the uses of the melamine-polyamine condensates as catalysts for the polyurethane synthesis, as hardeners for epoxy resins, as DNA transfection agents or as initiators for alkoxylating reactions with ethylene oxide or propylene oxide for the preparation of polyols are described. No mention is made that the melamine-polyamine condensates could be used for the preparation of graft copolymers, which, in turn, could be used in CMP slurries.

OBJECTS OF THE INVENTION

It was the object of the present invention to provide novel aqueous polishing agents for the polishing, in particular for the CMP of patterned and unstructured metal surfaces, preferably of patterned metal surfaces, more preferably of metal patterns embedded in dielectric materials, in particular copper containing patterns, which novel polishing agents do not exhibit the disadvantages of the prior art.

In particular, the novel aqueous polishing agents ought to exhibit an excellent polishing efficiency and a significantly reduced dishing during the copper damascene process. The novel aqueous polishing agents ought to exhibit no undesired corrosive effects and ought to effectuate significantly less defects, scratches and pitting in the materials, particularly the metals and the ultra-low-k dielectric materials, to be polished.

Additionally, the novel aqueous polishing agents should not leave significant stains on the polished surfaces and exhibit a low static etch rate SER and a high material removal rate MRR so that the planarization efficiency is high. The high material removal rate MRR ought to be achieved even without additional complexing agents which might undesirably interact with other additives or cause an undesirable high static etch rate SER.

Furthermore, new graft copolymers should be provided, which graft copolymers should be useful as components for aqueous polishing agents.

Last but not least, it was the object of the invention to provide a novel polishing process, preferably a novel CMP process for polishing, preferably for chemically and mechanically polishing, patterned and unstructured, preferably patterned metal surfaces, most preferably metal surfaces embedded in dielectric materials, and particularly of copper containing structures, which novel polishing process does no longer exhibit the disadvantages of the prior art and does effectuate a significantly reduced dishing in the materials to be polished and does significantly reduce undesired corrosion, defects, scratches and pitting in the materials to be polished and exhibits a high planarization efficiency and does leave less stains on the polished surfaces.

SUMMARY OF INVENTION

Accordingly, the novel aqueous polishing agent has been found, comprising, as an abrasive, at least one kind of polymer particles (A) finely dispersed in the aqueous phase and having at their surface a plurality of at least one type of functional groups (a1) capable of interacting with the metals and/or the metal oxides on top of the surfaces to be polished and forming complexes with the said metals and metal cations, the said polymer particles (A) being preparable by the emulsion or suspension polymerization of at least one monomer containing at least one radically polymerizable double bond in the presence of at least one oligomer or polymer containing a plurality of functional groups (a1).

Hereinafter, the novel aqueous polishing agent is referred to as the "CMP agent of the invention".

Moreover, the new graft copolymers have been found, which are preparable by the emulsion or suspension polymerization of at least one monomer containing at least one radically polymerizable double bond in the presence of at least one oligomeric or polymeric aminotriazine-polyamine condensate.

Hereinafter, the new graft copolymers are referred to as the "graft copolymers of the invention".

Additionally, a novel process for the chemical and mechanical polishing of patterned and unstructured metal surfaces has been found, comprising the steps of
  (I) preparing, by the emulsion or suspension polymerization of at least one monomer containing at least one radically polymerizable double bond in the presence of at least one oligomer or polymer containing a plurality of functional groups (a1), at least one kind of polymer particles (A) having at their surface a plurality of at least one type of functional groups (a1) capable of interacting with the metals and/or the metal oxides on top of the surfaces to be polished and forming complexes with the said metals and metal cations;
  (II) preparing an aqueous polishing agent containing the at least one kind of polymer particles (A) finely dispersed in an aqueous phase as the abrasive; and
  (III) chemically and mechanically polishing the said metal surfaces with the said aqueous polishing agent.

Hereinafter, the novel process for the chemical and mechanical polishing of patterned and unstructured surfaces is referred to as the "CMP process of the invention"

Last but not least, the novel use of the CMP agent of the invention and of the CMP process of the invention for the production of wafers containing integrated circuits has been found, which use is hereinafter referred to as the "use of the invention".

ADVANTAGES OF THE INVENTION

In view of the prior art discussed above, it was surprising and could not be expected by the skilled artisan that the objects underlying the present invention could be solved by the CMP agent, the CMP process and the use of the invention.

In particular, it was surprising that the CMP agent of the invention was excellently suited for the CMP of patterned and unstructured metal surfaces, preferably of patterned metal surfaces, more preferably of metal patterns embedded in dielectric materials, in particular copper containing patterns, and did not exhibit the disadvantages of the prior art.

In particular, the CMP agent of the invention had an excellent polishing efficiency with significantly reduced dishing during the copper damascene process. The CMP agent of the invention exhibited much less undesired corrosive effects and did effectuate significantly less defects, scratches and pitting in the materials to be polished.

Additionally, the CMP agent of the invention did leave hardly any stains on the polished surfaces and exhibited a low static etch rate SER and a high material removal rate MRR so that the planarization efficiency was high.

Surprisingly, the graft copolymers of the invention were excellently suited as components, in particular as abrasives, for CMP agents, in particular the CMP agents of the invention.

Moreover, the CMP process of invention was also excellently suited for polishing, preferably for chemically and mechanically polishing, patterned and unstructured surfaces, preferably patterned metal surfaces, most preferably metal surfaces embedded in dielectric materials, and particularly of copper containing structures, and did no longer exhibit the disadvantages of the prior art. In particular, it did effectuate significantly less dishing in the materials to be polished and did lead to much less of the undesired corrosion, defects, scratches and pitting in the materials to be polished, exhibited a high planarization efficiency and did leave hardly any stains on the polished surfaces.

All in accordance with the use of the invention, the CMP agent and the CMP process of the invention were excellently suited for the production of wafers containing copper damascene patterns. Therefore, exceptionally high fabrication efficiency in the production of ultrahigh density integrated circuits (ICs) could be achieved.

DETAILED DESCRIPTION OF THE INVENTION

The CMP agent of the invention comprises, as the abrasive, at least one kind, preferably one type of polymer particles (A), including polymer particles (A) containing or consisting of the graft copolymers of the invention, finely dispersed in the aqueous phase.

The particle size of the polymer particles (A), including polymer particles (A) containing or consisting of the graft copolymers of the invention, can vary broadly. Preferably, they have a particle size in the range of from 1 to 1000 nm, more preferably 10 to 750 nm, most preferably 50 to 500 nm and particularly preferably 100 to 400 nm as measured by HPPS dynamic light scattering.

The particle size distribution can be monomodal or multimodal, in particular, bimodal. In order to have an easily reproducible property profile and easily reproducible conditions during the CMP process of the invention, a monomodal particle size distribution is most particularly preferred. The particle size distribution can also vary broadly. In order to have an easily reproducible property profile and easily reproducible conditions during the CMP process of the invention a narrow particle size distribution is preferred. Most preferably, the mean particle size d50 is in the range of from 2 to 900 nm, more preferably 15 to 700 nm, most preferably 75 to 450 nm and particularly preferably 125 to 350 nm as measured by HPPS dynamic light scattering.

The solid polymer particles (A), including polymer particles (A) containing or consisting of the graft copolymers of the invention, are stable during storage and handling.

Preferably, the number average molecular weight of the polymer particles (A), including polymer particles (A) containing or consisting of the graft copolymers of the invention, is high, more preferably, higher than 10,000 Dalton, more preferably higher than 100,000 Dalton and most preferably higher than 1,000,000 Dalton. In the case of cross-linked solid polymer particles (A) the number average molecular weight is theoretically infinite.

Preferably, the glass transition temperature of the polymer particles (A), including polymer particles (A) containing or consisting of the graft copolymers of the invention, is above room temperature, more preferably above 50° C. and most preferably above 100° C. as measured by differential scanning calorimetry DSC.

The solid polymer particles (A), including polymer particles (A) containing or consisting of the graft copolymers of the invention, have at their surface at least one kind, preferably one kind of functional groups (a1) capable of interacting with the metal of and/or the metal oxides on top of the surfaces to be polished and forming complexes with the said metals and metal cations. "Interaction" or "interacting" means that the polymer particles (A) have a strong affinity to the said metal surface and/or the metal oxides on top of it generated during the CMP process of the invention and are physically and/or chemically adsorbed by the said surface. The physical adsorption is accomplished, for example, by electrostatic attraction and/or Van der Waals forces. The chemical adsorption is accomplished, for example, by the formation of covalent bonds. The "formation of complexes" means that the functional groups (a1) react with the metal atoms or the metal cations to form coordination compounds which are thermodynamically and/or kinetically stable in the aqueous medium of the CMP agent of the invention, i.e. the complexes have a very low dissociation constant so that the chemical equilibrium is shifted to the side of the complexes (cf. Römpp Online 2009, "coordination theory").

In the context of the present invention the term "metal" also includes metal alloys. Preferably, the metal has a standard reduction potential $E^0 > -0.1$ V, preferably $>0$ V, most preferably $>0.1$ V and in particular $>0.2$ V for the half-reaction $$M \leftrightharpoons M^{n+} + n\ e^-,$$ wherein n=integer of from 1 to 4 and $e^-$=electron.

Examples for such standard reduction potentials $E^0 > -0.1$ are listed in the CRC Handbook of Chemistry and Physics, 79th edition, 1998-1999, CRC Press LLC, Electrochemical Series, 8-21 to 8-31.

Preferably, the metal is selected from the group consisting of Ag, Au, Bi, Cu, Ge, Ir, Os, Pd, Pt, Re, Rh, Ru, Tl and W, most preferably Ag, Au, Cu, Ir, Os, Pd, Pt, Re, Rh, Ru and W. In particular, the metal is copper.

The interaction of the polymer particles (A), including polymer particles (A) containing or consisting of the graft copolymers of the invention, is accomplished by way of the functional groups (a1) located at the surface of the polymer particles (A).

Any kind of groups can be used as the functional groups (a1) as long as they are capable of interacting and forming complexes with the metals and metal cations, stable in aqueous media and do not disadvantageously interact with the polymerization reactions during the preparation of the polymer particles (A) and/or with the functional groups of the optional ingredients (B) which may be present. Examples of such disadvantageous interactions are the undesired suppression of the polymerization, the undesired decomposition of reactants and products or the agglomeration and flocculation of the polymer particles (A).

Therefore, the functional groups (a1) may be selected from the group consisting of non-ionic functional groups (a1), cationic functional groups (a1), functional groups (a1) which can form cationic functional groups, and anionic functional groups (a1), and functional groups (a1) which can form anionic functional groups (a1), as long as they exhibit the above-mentioned property profile.

Preferably, the non-ionic functional groups (a1) are selected from the group consisting of known and customary chelating groups.

Preferably, the anionic functional groups (a1) are selected from the group consisting of carboxylic acid, sulfonic acid and phosphonic acid groups and their anions.

Most preferably, cationic functional groups (a1) or functional groups (a1) which can form cationic functional groups are used. Even more preferably, the cationic functional groups (a1) are selected from the group consisting of primary, secondary and tertiary amino groups and quaternary ammonium groups. Most preferably, primary amino groups are used.

The functional groups (a1) are introduced into the polymeric particles (A), including polymer particles (A) containing or consisting of the graft copolymers of the invention, via the oligomers or polymers containing a plurality of the functional groups (a1) hereinafter described.

The capability of the functional groups (a1) of interacting with the metals and/or the metal oxides and of forming complexes with the metals and their cations can also be influenced by the chemical nature of the polymer chains, the outer shape and the structure of the polymer particles (A).

Thus, the polymer particles (A), including polymer particles (A) containing or consisting of the graft copolymers of the invention, can have different shapes. For example, they can have the shape of cubes, cubes with champfered edges, octahedrons, icosahedrons, nodules or spheres with or without protrusions or indentations. Preferably, they are spherical with no or only very few protrusions or indentations because this shape increases both, the resistance to the mechanical forces the particles are exposed to during the CMP process of the invention and the chemical stability to the other components of the CMP agent of the invention.

Moreover, they can be homogeneous materials or inhomogeneous materials such as composite materials or materials with core-shell structures. They can be hollow or compact. Or they can have a spongy structure with a high specific surface capable of absorbing metal atoms or cations. Preferably, they are compact because the compactness increases both, the resistance of the particles (A) to the mechanical forces and their chemical stability.

The polymer particles (A), including polymer particles (A) containing or consisting of the graft copolymers of the invention, are prepared by the emulsion or suspension polymerization of at least one monomer containing at least one, preferably one, radically polymerizable, preferably ethylenic, double bond in the presence of at least one oligomer or polymer containing a plurality of at least one type of functional groups (a1).

Preferably, the oligomer or polymer containing a plurality of at least one type of functional groups (a1) is selected from the group consisting of aminotriazine-polyamine condensates, polyethylenimines and polyamino acids and polypeptides of basic alpha-amino acids, in particular aminotriazine-polyamine condensates.

In the context of the present invention the terms "oligomeric" or "oligomer" mean that the materials concerned have an average degree of polymerization not higher than 12, whereas the terms "polymeric" or "polymer" mean that the materials concerned have an average degree of polymerization higher than 12.

In the context of the present invention the terms "emulsion polymerization" and "suspension polymerization" are used as defined in Römpp Online 2009, "emulsion polymerization" and "suspension polymerization". The emulsion polymerization can be carried out as described in the European patent application EP 0 919 602 A1, page 3, paragraphs [0023] to [0030] using water-soluble redox initiators. The suspension polymerization can be carried out as described in the European patent application EP 1 077 240 A1, page 4, paragraphs [0031] and [0032] using initiators which are soluble in organic media.

Suitable monomers are described, for example, in the European patent applications EP 0 919 602 A1, page 3, paragraphs [0020] and [0022] and EP 1 077 240 A1, page 4, paragraph [0032] and page 5, paragraphs [0035] to [0037] or in the German patent application DE 101 26 652 A1, page 14, paragraph [0152] to page 16, paragraph [0170].

If the monomers contain functional groups, they are chosen such that they do not cause undesired interactions with the functional groups of the oligomers or polymers such as agglomeration, flocculation and/or decomposition. Preferably, the monomers contain no functional groups or nonreactive functional groups. More preferably, (meth)acrylic acid esters which are essentially free from acid groups, vinyl esters of branched monocarboxylic acids having 5 to 18 carbon atoms in the molecule, cyclic or non-cyclic olefins, (meth)acrylic acid amides, vinyl aromatic hydrocarbons, nitriles, vinyl compounds, polysiloxane macromonomers, and acryloxy silane groups containing vinyl monomers are used. Even more preferably, (meth)acrylicacid amides (methacrylamides) and vinyl aromatic hydrocarbons, in particular methacrylicacid amide and styrene are used.

The suspension or emulsion polymerization of the monomer or the monomers described hereinbefore is carried out in the presence of at least one, preferably one, oligomer or polymer containing a plurality of at least one type of functional groups (a1) as described hereinbefore.

Most preferably, the oligomer or polymer containing a plurality of at least one type of functional groups (a1) is selected from the group consisting of aminotriazine-polyamine condensates, polyethylenimines and polyamino acids and polypeptides of basic alpha-amino acids, in particular aminotriazine-polyamine condensates, which are the graft basis of the graft copolymers of the invention.

Preferably, the aminotriazine is selected from the group consisting of melamine and benzoguanamines, with melamine being particularly preferably used. Therefore, melamine-polyamine condensates, in particular the highly branched melamine-polyamine condensates described in the international patent application WO 2008/148766 A1, page 2, line 35 to page 5, line 25 in conjunction with the examples 1 to 9, page 10, line 6 to page 15, line 6, are preferably used. Most preferably, melamine-tetraethylene pentaamine condensates are used.

Preferably, the polyethylenimines are selected from the group consisting of branched polyethylenimines containing primary, secondary and tertiary amino groups and having a number average molecular weight of from 450 to 100,000 Dalton as described, for example, in Römpp Online 2009, "polyethylenimines".

Preferably, the polyamino acids are prepared from synthetic basic alpha-amino acids, preferably by the reaction of Leuchs-anhydrides (1,3-oxazolidine-2,5-diones).

Preferably, the polypeptides are prepared from naturally occurring basic alpha-amino acids, preferably selected from the group consisting of lysine, arginine, ornithine and histidine, in particular lysine. Therefore, polylysine is most preferably used as the polypeptide.

Most preferably, the highly branched melamine-polyamine condensates are used as the oligomeric or polymeric compounds, which are also the graft basis for the graft copolymers of the invention.

Preferably, the oligomeric or polymeric compounds contain at least one, more preferably at least two, even more preferably at least three, most preferably at least four and, most particularly preferably, at least five reactive grafting centers to which centers the monomers are grafted.

These grafting centers can be formed by chemical bonds which are easily cleaved and yield free radical centers.

Preferably, the grafting centers contain at least one radically polymerizable double bond which can already be present in the oligomeric or polymeric compound or can be introduced into it by way of reacting the functional groups (a1), particularly, the amino groups (a1) of the oligomers or polymers with a suitable monomer containing at least one, preferably one, group capable of reacting with the functional groups (a1), particularly, an amino reactive functional group as for example an epoxy group. Suitable epoxy group containing monomers are, for example, glycidyl acrylate and glycidyl methacrylate, with glycidyl methacrylate being most preferably used.

The mass ratio of the oligomeric or polymeric compound to the monomers to be radically polymerized by the emulsion or the suspension polymerization and the monomers containing at least one group capable of reacting with the functional groups (a1), particularly, an amino reactive functional group, can vary broadly and, therefore, can be easily adapted to the requirements of particular embodiments. Preferably, the mass ratio of oligomeric or polymeric compound to monomer is from 1:1 to 0.05:1, more preferably 0.8:1 to 0.1:1 and most preferably 0.5:1 to 0.15:1.

The solids content of the dispersion of the polymer particles (A) resulting from the emulsion or suspension polymerization can vary broadly and, therefore, can be adapted easily to the requirements of particular embodiments. Preferably, the solids content is from 5 to 30% by weight, more preferably 10 to 27.5 and most preferably 15 to 25% by weight, each weight percentage being based on the complete weight of the dispersion.

The dispersion of the polymer particles (A) can be used directly for preparing the CMP agent of the invention. However, it is also possible to isolate the polymer particles (A), including polymer particles (A) containing or consisting of the graft copolymers of the invention, and to store them as solids until further use. Although this requires separate process steps for the isolation and the redispersion, the storage in solid form can be advantageous because the solids are more stable to the attack by bacteria or fungi than the dispersions themselves.

The CMP agents of the invention can contain the polymer particles (A), including polymer particles (A) containing or consisting of the graft copolymers of the invention, in varying amounts. Preferably, the amount of the polymeric particles (A) is from 0.1 to 20% by weight, more preferably 0.2 to 15% by weight, most preferably 0.3 to 10% by weight and particularly 0.5 to 5% by weight, based on the complete weight of a given CMP agent of the invention.

The CMP agents of the invention can furthermore contain at least one functional additive (B) customarily used in CMP agents. Preferably, the functional additive (B) is selected from the group consisting of oxidizing agents, complexing agents, passivating film-forming agents, surfactants, polyvalent metal ions, pH regulators, and solid inorganic and organic particles.

Suitable oxidizing agents (B) and their effective amounts are known, for example, from the European patent application EP 1 036 836 A1, page 8, paragraphs [0074] and [0075]. Preferably, organic and inorganic peroxides, more preferably inorganic peroxides, are used. In particular, hydrogen peroxide is used.

Preferably, the complexing agent (B) is an organic non-polymeric compound. The complexing agent (B) can be dissolved in the aqueous phase of the CMP agent of the invention. It is capable of interacting with the metal of and/or the metal oxides on top of the surfaces to be polished in the aforementioned sense. It is furthermore capable of forming strong, water-soluble complexes with the said metals, in particular, copper. These strong complexes can be formed with the zerovalent metal atoms and/or the respective metal cations. "Strong" means that the complexes have a very low dissociation constant due to a high thermodynamic and/or kinetic stability so that the chemical equilibrium is shifted to the side of the complexes. Customarily, the complexing agent (B) causes an increase of the material removal rate MRR of the metal surfaces to be polished with increasing concentration of the complexing agent (B) in the CMP agent of the invention, in particular, under the conditions of the CMP process of the invention. Moreover, the complexing agent (B) customarily causes an increase of the static etch rate SER of the metal surfaces to be polished with increasing concentration of the complexing agent (B) in the CMP agent of the invention.

In principle, all organic non-polymeric compounds having the property profile described above can be selected as the complexing agent (B).

Preferably, the complexing agent (B) is selected from the group consisting of polyamines, carboxylic acids, polyaminocarboxylic acids and amino acids.

More preferably, the polyamine (B) is selected from the group consisting of ethylenediamine, propylenediamine and diethylenetriamine.

More preferably, the carboxylic acid (B) is selected from the group consisting of p-toluenesulfonic acid, dodecylbenzenesulfonic acid, isoprenesulfonic acid, gluconic acid, lactic acid, citric acid, tartaric acid, malic acid, glycolic acid, malonic acid, formic acid, oxalic acid, succinic acid, fumaric acid, maleic acid and phthalic acid.

More preferably, the polyaminocarboxylic acid (B) is selected from the group consisting of nitrilotriacetic acid, ethylenediaminetetraacetic acid and diethylenetriaminepentaacetic acid.

More preferably, the amino acid (B) is selected from the group consisting of glycine, lysine, arginine and histidine, most preferably glycine.

The amino acids (B) are particularly preferably used, with glycine being most particularly preferably used.

Suitable passivating film-forming agents such as quinaldinic acid, quinolinic acid, benzotriazole BTA, benzoimidazole, 7-hydroxy-5-methyl-1,3,4-triazaindolizine, nicotinic acid and picolinic acid, in particular BTA, are known from the US patent application US 2006/0243702 A1.

Suitable surfactants (B) and their effective amounts are known, for example, from the international patent application WO 2005/014753 A1, page 8, line 23, to page 10, line 17.

Suitable polyvalent metal ions (B) and their effective amounts are known, for example, from the European patent application EP 1 036 836 A1, page 8, paragraph [0076] to page 9, paragraph [0078].

Suitable pH regulators (B) are known, for example, from the European patent application EP 1 036 836 A1, page 8, paragraphs [0080], [0085] and [0086], or the international patent application WO 2005/014753 A1, page 12, lines 19 to 24. Most preferably, the pH of the CMP agent of the invention is adjusted to 3 to 7, particularly 4 to 6.

Suitable solid organic particles (B) can be based on dicyandiamide and triazines containing at least one primary amino group. Such solid organic particles (B) and their effective amounts are known, for example, from the international patent applications WO 2005/014753 A1 and WO 2006/074248 A2.

Suitable solid inorganic particles (B) which may be used as inorganic abrasive particles and their effective amounts are known, for example, from the international patent application WO 2005/014753 A1, page 12, lines 1 to 8. However, it is particularly preferred that the CMP agent of the invention does not contain any solid inorganic particles (B).

The CMP agent of the invention is preferably prepared in the course of the CMP process of the invention, which comprises the steps of (I) preparing, by the emulsion or suspension polymerization of at least one monomer containing at least one radically polymerizable double bond in the presence of at least one oligomer or polymer containing a plurality of functional groups (a1), preferably selected from the group consisting of aminotriazine-polyamine condensates, polyethylenimines and polyamino acids and polypeptides of basic alpha-amino acids, in particular aminotriazine-polyamine condensates, at least one type of polymer particles (A) as described hereinbefore having at their surface a plurality of at least one type of functional groups (a1) capable of interacting with the metals and/or the metal oxides on top of the surfaces to be polished and forming complexes with the said metals and metal cations;

(II) preparing an aqueous polishing agent containing the at least one kind of polymer particles (A) finely dispersed in an aqueous phase as the abrasive; and (III) chemically and mechanically polishing the said metal surfaces with the said aqueous polishing agent.

The preparation of the CMP agents of the invention does not exhibit any particularities but can be carried out by dissolving or dispersing the above-described constituents (A) and optionally (B) in an aqueous medium, in particular, deionized water. For this purpose, the customary and standard mixing processes and mixing apparatuses such as agitated vessels, in-line dissolvers, high shear impellers, ultrasonic mixers, homogenizer nozzles or counterflow mixers, can be used. Preferably, the CMP agents of the invention thus obtained are filtered through filters of the appropriate mesh aperture, in order to remove coarse-grained particles such as the agglomerates or aggregates of the solid, finely dispersed abrasives (A).

The CMP agents of the invention are used for the CMP of the most diverse patterned and unstructured, in particular patterned metal surfaces.

Preferably, the patterned metal surfaces consist of metal patterns and metal-dielectric patterns. Most preferably, the metal patterns and the metal-dielectric patterns contain or consist of at least one, in particular one metallic material selected from the group consisting of the metals as defined above and their alloys. In particular, copper is used as the metal.

As the dielectrics, the customarily used organic and inorganic dielectrics can be employed. Examples of suitable dielectrics are known from the European patent application EP 1 306 415 A2, page 4, paragraph [0031]. In particular, silicon dioxide is used as the dielectric.

In particular, the metal-dielectric patterns concern copper-dielectric patterns used in the copper damascene process for the fabrication of wafers with ICs, in particular ultra-high-density ICs.

As is known in the art, the metal-dielectric patterns, in particular the copper-dielectric patterns, can contain customarily used barrier layers. Examples of suitable barrier layers are also known from the European patent application EP 1 306 415 A2, page 4, paragraph [0032].

The polishing process of the invention exhibits no particularities but can be carried out with the processes and the equipment customarily used for the CMP in the fabrication of wafers with ICs.

As is known in the art, typical equipment for the CMP consists of a rotating platen which is covered with a polishing pad. The wafer is mounted on a carrier or chuck with its upper side down facing the polishing pad. The carrier secures the wafer in the horizontal position. This particular arrangement of polishing and holding device is also known as the hard-platen design. The carrier may retain a carrier pad which lies between the retaining surface of the carrier and the surface of the wafer which is not being polished. This pad can operate as a cushion for the wafer.

Below the carrier, the larger diameter platen is also generally horizontally positioned and presents a surface parallel to that of the wafer to be polished. Its polishing pad contacts the wafer surface during the planarization process. During the CMP process of the invention, the aqueous CMP agent of the invention is applied onto the polishing pad as a continuous stream or in dropwise fashion.

Both the carrier and the platen are caused to rotate around their respective shafts extending perpendicular from the carrier and the platen. The rotating carrier shaft may remain fixed in position relative to the rotating platen or may oscillate horizontally relative to the platen. The direction of rotation of the carrier typically, though not necessarily, is the same as that of the platen. The speeds of rotation for the carrier and the platen are generally, though not necessarily, set at different values.

Customarily, the temperature of the platen is set at temperatures between 10 and 70° C.

For further details reference is made to the international patent application WO 2004/063301 A1, in particular page 16, paragraph [0036] to page 18, paragraph [0040] in conjunction with the FIG. 1.

By way of the CMP process of the invention and the CMP agent of the invention wafers with ICs comprising copper damascene patterns can be obtained which have an excellent functionality.

EXAMPLES

Example 1

Preparation of Polymer Particles (A)

A 2 L reaction flask fitted with an anchor stirrer, a reflux condenser and three feeding lines for feeding at room temperature, was charged under nitrogen with 425 g of deionized water and 30 g of a melamine-tetraethylene pentaamine condensate prepared in accordance with the general method described in the international patent application WO 2008/148766 A1 by melting together melamine and tetraethylene pentaamine and splitting off ammonia, thereby using ammonium chloride as the catalyst. The contents of the flask were heated to 80° with continued stirring. Thereafter, the initial pH value was adjusted to 5 using a 65% by weight solution of nitric acid. At 80° C., 12 g of glycidylmethacrylate were charged into the reactor and allowed to react with the melamine-tetraethylene pentaamine condensate for 30 minutes. Thereafter, 2 g of a radical initiator [2,2'-azo-(2-amidinopropane)dihydrochloride; V-50, Vazo 50 from Wako] and 66.5 g of deionized water were charged into the reactor. Simultaneously, two monomer feeds were started and continuously fed to the reaction flask for 90 minutes:

Feed I: 26.667 g of methacrylamide as a 15% by weight aqueous solution and 243.5 g of deionized water;

Feed II: 184 g of styrene.

After 30 minutes from the start of the monomer feeds I and II, an initiator feed consisting of 2 g of V-50 and 43.75 g of deionized water was started and continuously fed to the reaction flask for 70 minutes. After the end of the feeds, the reaction mixture was post-polymerized for 2 hours at 80° C. and then cooled down to room temperature. A dispersion of polymer particles (A) having a 22.7% by weight solids content was obtained. The polymer particles (A) exhibited a mean particle size d50 of 295 nm as measured by HPPS-dynamic light scattering. The dispersion was excellently suited for preparing CMP agents.

Example 2

Preparation of a CMP Agent Containing Solid Polymer Particles (A)

Using the polymer particles (A) of the example 1, the CMP agent of the example 2 was prepared having the following composition: 1% by weight of polymer particles (A), 1% by weight hydrogen peroxide (B) and 0.2% by weight glycine (B). The pH of the CMP agent was adjusted to 5 with nitric acid.

The static etch rate SER of the CMP agent of the invention was determined as follows:

Copper discs were initially conditioned, washed, dried and then weighed before each experiment. Copper disks were immersed for 10-20 seconds in 2% nitric acid and then rinsed with deionized $H_2O$ and subsequently dried with compressed air. Then Cu disks were directly immersed in the stirred CMP agents (A1) to (A4) in a first series at 20° C. for 3 min and in a second series at 50° C. for 10 minutes each. After the etching, the copper discs were cleaned with deionized water followed by an isopropyl alcohol rinse. Thereafter, the copper discs were dried with a steady stream of pressurized air, and the SER was calculated on the net weight-loss and the surface area of the disc using the following calculation:

$$SER = \text{Weight-loss}/[\text{Density} \times (\text{Circumferential Area} + 2 \times \text{Area of Cross-section}) \times \text{Time}],$$

wherein

Weight-loss=loss of weight in copper disc after dissolution;

Density=density of copper;

Area of Cross-section=cross-section area of the disc;

Circumferential Area=circumferential area of the disc; and

Time=dissolution time.

The static etch rate SER at 50° C. of the CMP agent of the example was 67 nm/min.

The material removal rate MRR of the CMP agent of the example was determined as follows:

Again, the copper discs were conditioned (as explained before), washed, dried and then weighed before each experiment. Thereafter, they were attached to a stainless steel carrier and then mounted on a single-side polishing machine (CMP benchtop machine of CETR, Center for Tribology, Inc., Campbell, Calif.). A polyurethane IC 1000 polishing pad was used for the experiments. The copper discs were polished for 1 minute under a pressure of 17.24 kPa (2.5 psi) by supplying the CMP agent at a rate of 100 ml/min on the pad at room temperature. The copper discs had a rotational speed of 115 rpm and the pad had a rotational speed speed of 112 rpm. The pad was conditioned with diamond grit conditioner to remove the products of the chemical reactions and to make the pad ready for the next run. After polishing, the discs were cleaned with a deionized water rinse followed by an isopropyl alcohol rinse. Thereafter, the discs were dried with a steady stream of pressurized air, and the MRR was calculated based on the net weight-loss in the polished surface area according to the calculation:

$$MRR = \text{Weight-loss}/(\text{Density} \times \text{Area of Cross-section} \times \text{Time});$$

wherein

Weight-loss=loss of weight in copper disc after polish;

Density=density of copper;

Area of Cross-section=cross-section area of the disc; and

Time=polishing time.

The material removal rate MRR of the CMP agent of the example was 422 nm/min.

The invention claimed is:

1. An aqueous polishing agent, comprising:
polymer particles comprising graft copolymers finely dispersed in an aqueous phase and a functional group on a surface of the particles,
wherein:
the functional group is capable of interacting with a metal, a metal oxide, or both, on top of a surface to be polished;
the functional group is capable of forming a complex with the metal, a metal cation, or both;
the particles are obtained by a process comprising emulsion or suspension polymerizing a monomer in the presence of an oligomer or polymer;
the monomer comprises a radically polymerizable double bond;
the oligomer or polymer comprises the functional group;
the oligomer or polymer is at least one selected from the group consisting of an aminotriazine-polyamine condensate, a polyethylenimine, a polyamino acid comprising a basic alpha-amino acid, and a polypeptide comprising a basic alpha-amino acid; and
the oligomer or polymer comprises at least one reactive grafting center to which center(s) the monomers are grafted.

2. The aqueous polishing agent of claim 1, wherein the polymer particles have a primary particle size of from 1 to 1000 nm as measured by HPPS dynamic light scattering.

3. The aqueous polishing agent of claim 1, wherein the functional group is capable of forming a cation.

4. The aqueous polishing agent of claim 3, wherein the functional group is an amino group.

5. The aqueous polishing agent of claim 1, wherein the oligomer or polymer comprises at least one aminotriazine selected from the group consisting of melamine and a benzoguanamine.

6. The aqueous polishing agent of claim 1, wherein the at least one reactive grafting center comprises a radically polymerizable double bond.

7. The aqueous polishing agent of claim 6, wherein the radically polymerizable double bond of the oligomer or polymer is obtained by reacting the functional group with a monomer containing one group capable of reacting with the functional group.

8. The aqueous polishing agent of claim 7, wherein the functional group is an amino group and the group capable of reacting with the functional group is an epoxy group.

9. The aqueous polishing agent of claim 1, further comprising:
   at least one additional functional additive selected from the group consisting of an oxidizing agent, a complexing agent, a passivating film-forming agent, a surfactant, a polyvalent metal ion, a pH regulator, a solid organic particle, and a solid inorganic particle.

10. The aqueous polishing agent of claim 1, wherein a pH value of the agent is from 3 to 7.

11. The aqueous polishing agent of claim 1, wherein the metal, metal oxide, or both comprises copper.

12. The aqueous polishing agent of claim 1, wherein the oligomer or polymer comprises a polyamino acid, polypeptide, or both, comprising at least one basic amino acid is selected from the group consisting of lysine, arginine, ornithine, and histidine.

13. The aqueous polishing agent of claim 1, wherein the oligomer or polymer comprises at least five reactive grafting centers to which centers the monomers are grafted.

\* \* \* \* \*